G. W. ELDRIDGE.
NAVIGATION SYSTEM.
APPLICATION FILED MAY 20, 1912.
1,063,915.  Patented June 3, 1913.
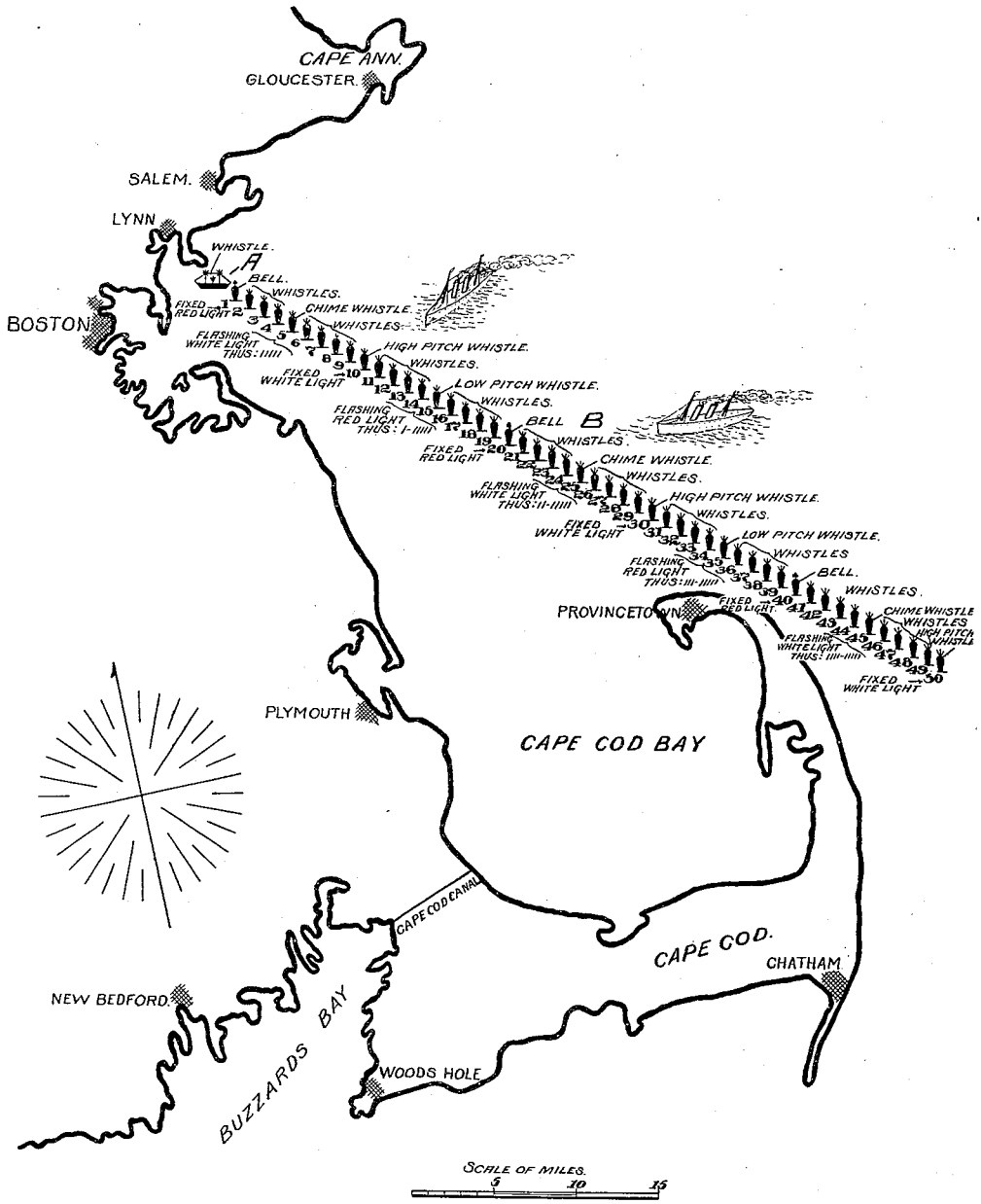
Witnesses:
Horace A. Crossman
Carl L. Choate
Inventor:
George W. Eldridge,
by Emery, Booth, Janny & Varney
Attys.

UNITED STATES PATENT OFFICE.

GEORGE W. ELDRIDGE, OF VINEYARD HAVEN, MASSACHUSETTS.

NAVIGATION SYSTEM.

1,063,915.  Specification of Letters Patent.  Patented June 3, 1913.

Application filed May 20, 1912. Serial No. 698,618.

*To all whom it may concern:*

Be it known that I, GEORGE W. ELDRIDGE, a citizen of the United States, and a resident of Vineyard Haven, Dukes county, and State of Massachusetts, (whose post-office address is 156 State street, Boston, Massachusetts,) have invented an Improvement in Navigation Systems, of which the following description, in connection with the accompanying drawings, is a specification, like characters on the drawings representing like parts.

This invention relates to navigation systems for designating a course or distance to or from a definite object, such for example, as a light ship or lighthouse.

The character of the invention may be best understood by reference to the following description of an illustrative embodiment thereof shown in the accompanying drawing, which discloses conveniently an illustrative navigation system embodying the invention.

A, designates a light ship shown thereon as located off the entrance of a city on the Massachusetts coast. To designate the course and distance to or from the light ship there are provided a series of signals shown thereon as buoys B, spaced preferably at equal distances apart, the distance between adjacent buoys being conveniently one mile. The buoys may be numbered in arithmetical progression extending seaward from the light ship. For example, the buoy nearest the light ship may be numbered 1, indicating its distance of one mile from the light ship, the second buoy numbered 2, indicating its distance of two miles from the light ship, and so on for any desired distance, such for example as fifty miles from the light ship. While a one mile unit distance between buoys is convenient, any other unit or spacing may be used if desired, so long as one or the other of two adjacent buoys are within "picking up" distance of each other, *i. e.* within "picking up" distance of a vessel intercepting the system and so long as the spacing, whether regular or irregular, is predetermined and known. The buoys may be placed in a straight, irregular or curved line, and may designate the course as well as the distance to the light ship from any buoy of the system.

Under certain circumstances, as in thick weather, it may be difficult to determine or recognize the number of a buoy of the system. Therefore, the buoys may be provided with suitable identifying means such as audible or other signals which would automatically sound at intervals and would have characteristic differences to avoid confusion. For purposes of illustration, buoy No. 1 may be equipped with an automatic bell of high pitch; buoys Nos. 2, 3 and 4 may be equipped with ordinary or even pitch automatic whistles; buoy No. 5 may be equipped with a special automatic chime whistle; buoys Nos. 6, 7, 8 and 9 may be equipped with ordinary or even pitch automatic whistles; buoy No. 10 may be equipped with a special high pitch automatic whistle; buoys Nos. 11, 12, 13 and 14 may be equipped with ordinary or even pitch automatic whistles; buoy No. 15 may be equipped with a special low pitch automatic whistle and buoys Nos. 16, 17, 18 and 19 may be equipped with ordinary or even pitch automatic whistles, while No. 20 would be a bell of low pitch. Thus in the illustration selected, every buoy is provided with a signal of some character and every fifth buoy is provided with a special sound signal which is different from all of the others. That is to say, buoys Nos. 1, 5, 10 and 15 of the series selected are respectively provided with an automatic high pitch bell, a special automatic chime whistle, a special high pitch automatic whistle, and a special low pitch automatic whistle. The buoys 20 to 50 may be similarly equipped with series of audible signals such as described. Navigation charts may be marked with these signals or mariners may readily familiarize themselves with them so that the direction of travel and location of the ship could be readily determined. For example, if the captain of a ship heard the high pitch automatic whistle and then heard the chime whistle then the high pitch bell he would know that he was approaching the light ship or his port of destination, whereas if he first heard the high pitch whistle and then the low pitch whistle he would know that he was going from the light ship or port of departure.

While the audible signals selected for purposes of illustration are highly desirable, any suitable audible or character of signal or identifying means, might be employed with sufficiently marked differences.

To prevent collision with the buoys at night, and to further assist in identifying them, they may be equipped with lights having characteristic differences or operated in any desired manner; for example, No. 1 buoy may be equipped with a fixed red light; No. 5 may be equipped with a flashing white light provided with usual mechanism for automatically effecting a series of flashes, thus:—1, 1, 1, 1, 1; buoy No. 10 may be equipped with a fixed white light; buoy No. 15 may be equipped with a flashing red light; automatically flashing its number thus:—1—1, 1, 1, 1, 1; buoy No. 20 may be equipped with a fixed red light; buoy No. 25 may be equipped with a flashing white light automatically flashing the number thus 1, 1—1, 1, 1, 1, 1; and so on throughout the series of the system from 20 to 50.

To illustrate the use of my system, it may be supposed that a vessel is attempting to make port in thick weather. A ship coming in from sea in fog, mist or falling snow, knowing that the system is established off the port, proceeds boldly to "run in". As the ship approaches the system the captain hears or sights a buoy or expressed nautically, "picks up" a buoy—some one of the fifty—it being impossible to pass through the line of buoys constituting the system and not hear or sight some one of them. He runs directly up to the buoy near enough to see its number. If it is numbered 25 he immediately knows that his ship is 25 miles from the light ship at the entrance of the harbor. He also knows that one mile from it is another buoy numbered 24, which means that his ship is 24 miles from the light ship. Thus as the ship progresses from one buoy to another the distance and direction to the light ship is determined from each and every buoy. Again, suppose a vessel be at number 44 buoy of the system and desires to go to some other port than that to which my system leads, she can shape her course directly from that buoy or any other buoy of the system to any other port.

As my system is intended to aid shipping to approach and enter any port in thick weather all buoys of the system would be left to the port or on the left, going in, in accordance with the established custom, also to the left or on the port when going seaward, thereby eliminating all risks of collision.

By the aid of my system, a sailing vessel with head or adverse winds in thick weather could approach the line of the system at any angle and cross it, and she could continue to verify her position at will, each time she tacked across the line; for example, if she first "made" No. 44 buoy she could "stand on close hauled" and "tack" at will and proceed to cross the line of the system again, which might be at No. 36 buoy, thus indicating that she was thirty-six miles from the light ship and had gained 8 miles toward it, and so on as she proceeds "tacking" across the line of the system she should be able to readily determine the direction and distance from the light ship at any time.

By my invention a ship approaching the coast or bound for a port in thick weather can run in or proceed boldly at any angle to the line of the system formed by the series of buoys, the captain feeling assured that he cannot miss some one of the buoys constituting the system. When once a buoy is sighted and its number discerned he immediately knows his exact course or distance to the light ship or other definite object, proceeds to the next buoy or a known distance thereof, and so on safely and surely to his port or destination without delay or danger.

While it is desirable to number the buoys in arithmetical progression employing one mile increments to readily indicate the distance of a buoy from a fixed point, yet the buoys might be provided with other characters, such for example as letters arranged in alphabetical order or may be otherwise marked or provided with identifying means so long as the nature or character of the same is known to the mariner.

While the system embodying my invention will be an unerring guide to a ship in making or leaving port, it may nevertheless be used in any locality, whether with reference to a given port or a given headland, or coastline, or shoal, or other definite object or position which it is desired to avoid or to reach:—Wherever located, whether with direct reference to a port or shore line or the like, or arbitrarily placed in the open sea, whenever its line is crossed by a vessel her position may be known with absolute certainty. If, for example, the system of buoys described should be projected out into the ocean off Cape Hatteras, any vessel proceeding up the coast and intercepting the line would at once know its position, however thick the weather might be. So, also, if a line of such buoys were projected southward from the Grand Banks off Newfoundland it would be impossible for a vessel, approaching the coast, to be in doubt as to its position in thick weather, because the moment it intercepted the line of the system at any point thereof the position of the vessel would be absolutely and reliably known.

So far as I am aware it has never before been proposed to project a system of position-identifying means such as buoys arbitrarily but predeterminately, that is to say, without necessary reference to shoals, rocks or the like—into the open water with sole reference, first, to facility of intercepting the system when approaching the locality, and second, to enable a true course to be laid from the point of interception to the port or destination beyond.

I have provided a series, that is an order or arrangement of devices for the purpose stated, one after another, said devices being arranged according to the rules or principles herein set forth, to constitute a succession or set, and extending as such and to constitute a system, across desired lines of travel of vessels, whereby the system will be intersected when reached, and the navigator will not be compelled to locate or to endeavor to locate a detached aid, such as a lightship or a fair way buoy, or even one of two fair way buoys, from which to shape his course to the next aid or to port. The series therefore accomplishes new results, and is the embodiment of a new idea, and is established in accordance with a new principle. Preferably, but not necessarily, the devices (such as buoys) are arranged at equal distances apart, such as a mile, and preferably I provide in the series a relatively large number of devices—I have herein shown fifty—though obviously this number, here given merely as a single illustration, may be and will be changed by decrease or by increase within the scope of the invention, and in accordance with the requirements or conditions of each locality where a system is to be established, or for other reasons. In every case, however, I position the buoys or other devices in such number and so spaced as to constitute a system for the purposes stated.

My series or system necessarily requires a larger number and a different arrangement from that or those now employed by the United States Government lighthouse officials, since according to the Government lighthouse arrangement now established the only buoys not marking channels or danger spots are fair way buoys, comprising only one or two buoys near the entrance to a channel for the purpose of locating the channel, and since the Government system of lightships aims merely so to place these aids that a vessel may follow the line of lightships rather than cross or intersect such line of lightships. While in a few instances a lightship has been placed by the United States Government so as to lie in a more or less irregular line with respect to fair way buoys, such arrangement is accidental rather than part of the system.

Although the devices are herein shown or described as separated by distances of one mile, other spacing may be adopted so long as the distances are such that one at least of the devices may be discovered from vessels midway between two adjacent devices of the system, in foggy and stormy weather.

Having described one embodiment of the invention without limiting the same thereto, what I claim as new and desire to secure by Letters Patent is:

1. An aid to navigation comprising a series of differentiated position-identifying devices respectively placed with no necessary reference to individual dangers but predeterminately placed relative to and within "picking up" distances from each other to constitute a system and projected as such across the desired lines of travel of vessels.

2. An aid to navigation comprising a series of visually differentiated position-identifying devices respectively placed with no necessary reference to individual dangers but predeterminately placed relative to and within "picking up" distances from each other to constitute a system and projected as such across the desired lines of travel of vessels.

3. An aid to navigation comprising a series of audibly differentiated position-identifying devices respectively placed with no necessary reference to individual dangers but predeterminately placed relative to and within "picking up" distances from each other to constitute a system and projected as such across the desired lines of travel of vessels.

4. An aid to navigation comprising a series of both visually and audibly differentiated position-identifying devices respectively placed with no necessary reference to individual dangers but predeterminately placed relative to and within "picking up" distances from each other to constitute a system and projected as such across the desired lines of travel of vessels.

5. An aid to navigation comprising a series of equally spaced, differentiated position-identifying devices respectively placed with no necessary reference to individual dangers but predeterminately placed relative to and within "picking up" distances from each other to constitute a system and projected as such across desired lines of travel of vessels.

6. An aid to navigation comprising a series of position-identifying devices numbered in arithmetical progression and respectively placed with no necessary reference to individual dangers but predeterminately placed relative to and within "picking up" distances from each other to constitute a system and projected as such across desired lines of travel of vessels.

In testimony whereof, I have signed my name to this specification in the presence of two subscribing witnesses.

GEORGE W. ELDRIDGE.

Witnesses:
EVERETT S. EMERY,
ROBERT H. KAMMLER.